US008122821B2

(12) United States Patent
Sands

(10) Patent No.: US 8,122,821 B2
(45) Date of Patent: Feb. 28, 2012

(54) FOOD-PROCESSING DEVICE

(75) Inventor: Lenny Sands, Encino, CA (US)

(73) Assignee: Homeland Housewares, LLC, Los Angeles, CA (US)

( * ) Notice: Subject to any disclaimer, the term of this patent is extended or adjusted under 35 U.S.C. 154(b) by 0 days.

(21) Appl. No.: 13/160,448

(22) Filed: Jun. 14, 2011

(65) Prior Publication Data
US 2011/0240782 A1    Oct. 6, 2011

Related U.S. Application Data

(63) Continuation of application No. 12/150,012, filed on Apr. 24, 2008, now Pat. No. 7,958,819, which is a continuation of application No. 10/988,281, filed on Nov. 13, 2004, now Pat. No. 7,430,957, which is a continuation-in-part of application No. 10/649,757, filed on Aug. 26, 2003, now Pat. No. 6,817,750.

(51) Int. Cl.
*A47J 43/046*    (2006.01)
*A47J 43/06*    (2006.01)
*A23N 1/00*    (2006.01)

(52) U.S. Cl. ............ 99/513; 99/510; 366/206; 366/205; 241/282.2

(58) Field of Classification Search ..................... 99/513, 99/10, 510; 366/199, 205, 206, 314; 241/282.1, 241/282.2
See application file for complete search history.

(56) References Cited

U.S. PATENT DOCUMENTS

| 1,480,914 A | 1/1924 | Poplawski |
| 2,299,730 A | 10/1942 | Bornstein |
| 2,304,476 A | 12/1942 | Poplawski |
| 2,530,455 A | 11/1950 | Forss |
| RE24,607 E | 2/1959 | Seyfried |
| 2,975,946 A | 3/1961 | Westgate |
| 3,064,949 A | 11/1962 | Dewenter |
| 3,085,710 A | 4/1963 | McIlroy |
| 3,101,857 A | 8/1963 | Freedman |
| 3,315,946 A | 4/1967 | Nissman |
| 3,346,029 A | 10/1967 | Harris |
| 3,417,972 A | 12/1968 | Vincent |
| 3,612,126 A | 10/1971 | Emmons et al. |
| 3,704,864 A | 12/1972 | Lee |
| 3,881,705 A | 5/1975 | Greenspan |

(Continued)

FOREIGN PATENT DOCUMENTS
DE    19602147 A1    7/1997
(Continued)

*Primary Examiner* — Reginald L Alexander
(74) *Attorney, Agent, or Firm* — Trojan Law Office

(57) ABSTRACT

A food-processing device for chopping, mixing, or liquefying foods. The device comprises a container, a removable base, and a blender base. The container comprises a locking member located at the periphery of the container. The container has an opening. The removable base comprises a blade member and is removably affixable to the opening of the container. The blender base comprises a motor and a recessed well. The recessed well comprises a pressure-activated switch and a locking groove located adjacent to the switch. The removable base is adapted to removably fit within the recessed well such that when the locking member contacts and depresses the switch, the downward movement of the switch activates the motor, wherein the container can be depressed and rotated to allow the locking member to engage the locking groove, thereby permitting continuous operation of the motor without requiring a user to exert constant pressure on the container.

3 Claims, 10 Drawing Sheets

U.S. PATENT DOCUMENTS

| | | | |
|---|---|---|---|
| 3,895,548 A | 7/1975 | Sauve | |
| 3,970,258 A | 7/1976 | Mantelet | |
| 4,087,053 A | 5/1978 | Voglesonger | |
| 4,111,372 A | 9/1978 | Hicks et al. | |
| 4,233,891 A | 11/1980 | Schindler et al. | |
| 4,345,517 A | 8/1982 | Arao et al. | |
| 4,397,427 A | 8/1983 | Howard | |
| 4,480,926 A | 11/1984 | Lattery, Jr. et al. | |
| 4,487,509 A | 12/1984 | Boyce | |
| 4,542,857 A | 9/1985 | Akasaka | |
| D281,945 S | 12/1985 | Boyce | |
| 4,561,782 A | 12/1985 | Jacobsen et al. | |
| 4,708,487 A | 11/1987 | Marshall | |
| 4,714,203 A | 12/1987 | Williams | |
| 4,723,719 A | 2/1988 | Williams | |
| 4,889,248 A | 12/1989 | Bennett | |
| 4,961,521 A | 10/1990 | Eckman | |
| 5,302,021 A | 4/1994 | Jennett et al. | |
| 5,323,973 A | 6/1994 | Ferrara, Jr. | |
| 5,355,784 A | 10/1994 | Franklin et al. | |
| 5,479,851 A | 1/1996 | McClean et al. | |
| 5,500,967 A | 3/1996 | Wilson et al. | |
| 5,636,923 A | 6/1997 | Nejat-Bina | |
| 5,639,161 A | 6/1997 | Sirianni | |
| 5,662,032 A | 9/1997 | Baratta | |
| 5,680,968 A | 10/1997 | Moore | |
| 5,690,021 A | 11/1997 | Grey | |
| 5,720,552 A | 2/1998 | Schinlegger | |
| 5,855,431 A * | 1/1999 | Costanzo | 366/199 |
| 5,882,113 A | 3/1999 | Binder | |
| 5,911,504 A | 6/1999 | Schindlegger, Jr. | |
| 6,065,861 A | 5/2000 | Chen | |
| 6,116,469 A | 9/2000 | Wallays et al. | |
| 6,135,019 A | 10/2000 | Chou | |
| 6,223,652 B1 | 5/2001 | Calia et al. | |
| D470,050 S | 2/2003 | Renz et al. | |
| D487,668 S | 3/2004 | Sands | |
| 6,758,592 B2 | 7/2004 | Wulf et al. | |
| 6,786,440 B2 | 9/2004 | Ling et al. | |
| 6,796,705 B1 | 9/2004 | Khubani | |
| 6,817,750 B1 | 11/2004 | Sands | |
| D500,633 S | 1/2005 | Sands | |
| D501,759 S | 2/2005 | Sands | |
| D517,862 S | 3/2006 | Sands | |
| D519,321 S | 4/2006 | Sands | |
| D521,802 S | 5/2006 | Sands | |
| 7,040,799 B2 | 5/2006 | Pryor | |
| 7,063,456 B2 | 6/2006 | Miller et al. | |
| 7,066,640 B2 | 6/2006 | Sands | |
| D532,255 S | 11/2006 | Sands | |
| D532,648 S | 11/2006 | Sands | |
| D536,216 S | 2/2007 | Sands | |
| 7,267,478 B2 | 9/2007 | Miller | |
| 2001/0036124 A1 | 11/2001 | Rubenstein | |
| 2002/0012288 A1 | 1/2002 | Masip et al. | |
| 2003/0193833 A1 | 10/2003 | Wulf et al. | |
| 2003/0213373 A1 | 11/2003 | Dickson, Jr. | |
| 2003/0214875 A1 | 11/2003 | Dickson, Jr. | |
| 2003/0230658 A1 | 12/2003 | Ling et al. | |
| 2005/0047272 A1 | 3/2005 | Sands | |
| 2005/0068846 A1 | 3/2005 | Wulf et al. | |
| 2005/0068847 A1 | 3/2005 | Sands | |
| 2005/0185507 A1 | 8/2005 | Beesley et al. | |
| 2005/0207270 A1 | 9/2005 | Beesley | |
| 2006/0007779 A1 | 1/2006 | Fernandez et al. | |
| 2006/0120215 A1 | 6/2006 | Sands | |
| 2006/0153003 A1 | 7/2006 | Sands | |
| 2006/0209627 A1 | 9/2006 | McGill | |
| 2007/0183256 A1 | 8/2007 | Sands | |

FOREIGN PATENT DOCUMENTS

| | | |
|---|---|---|
| EP | 0562310 A1 | 9/1993 |
| JP | 5-199943 | 8/1993 |
| JP | 5-199944 | 8/1993 |
| JP | 6-319656 | 11/1994 |
| JP | 9-65988 | 3/1997 |
| JP | 10-117944 | 5/1998 |
| JP | 11-137454 | 5/1999 |
| JP | 2000-201837 | 7/2000 |
| JP | 2000-201838 | 7/2000 |
| JP | 2002-177155 | 6/2002 |
| JP | 2002-291627 | 10/2002 |
| JP | 2002-336139 | 11/2002 |
| JP | 2003-259994 | 9/2003 |
| JP | 2003-259995 | 9/2003 |
| JP | 2004-16693 | 1/2004 |
| KR | 1996-0007233 | 7/1995 |
| KR | 10-0263732 | 5/2000 |
| KR | 20-0202865 | 8/2000 |
| KR | 10-0323245 | 1/2002 |
| WO | 03/003888 A1 | 1/2003 |
| WO | 03/005871 A1 | 1/2003 |
| WO | 03/075726 A1 | 9/2003 |

* cited by examiner

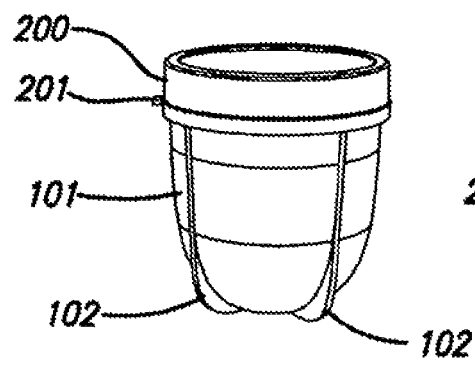
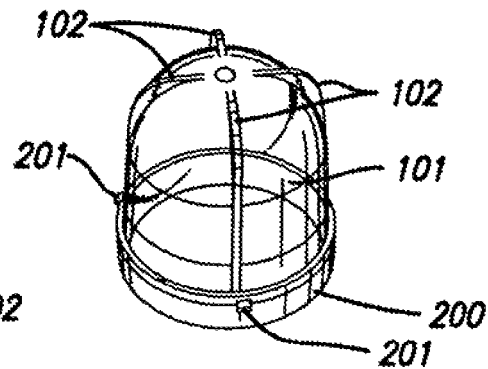
FIG. 2A     FIG. 2B
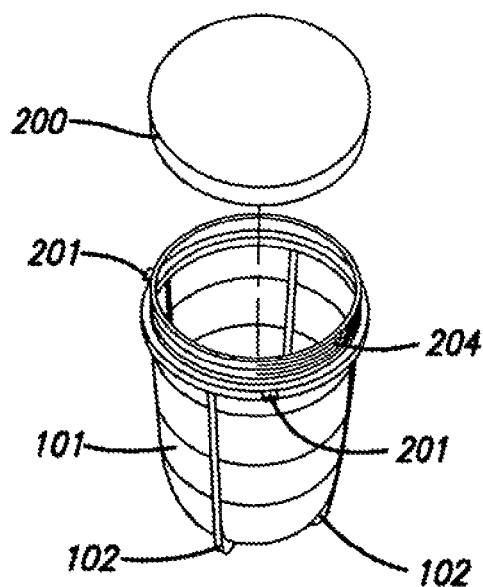
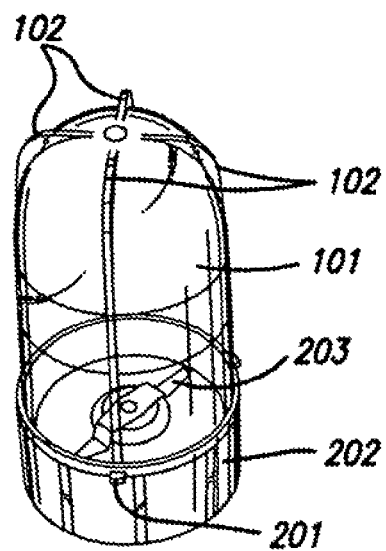
FIG. 2C     FIG. 2D

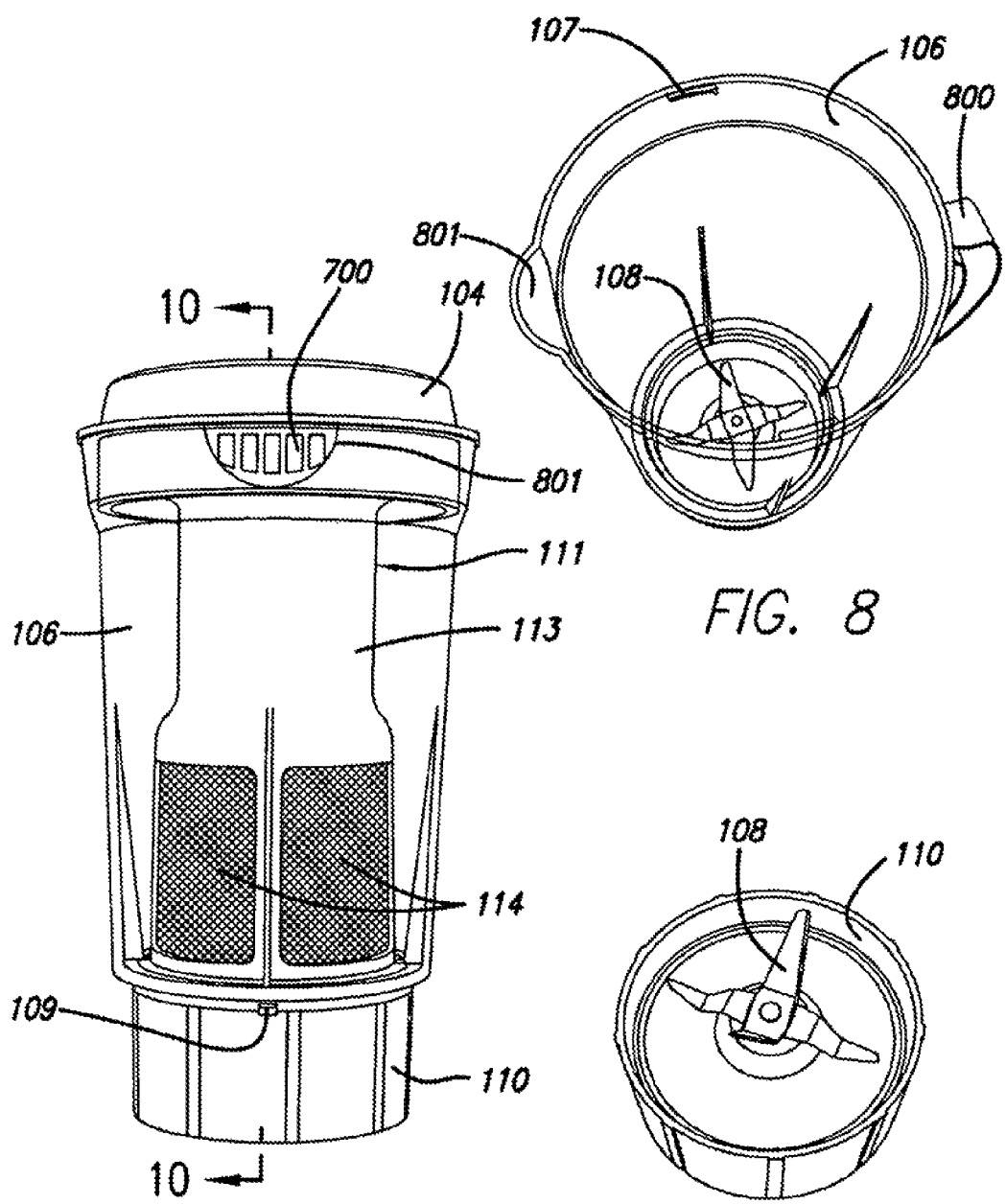

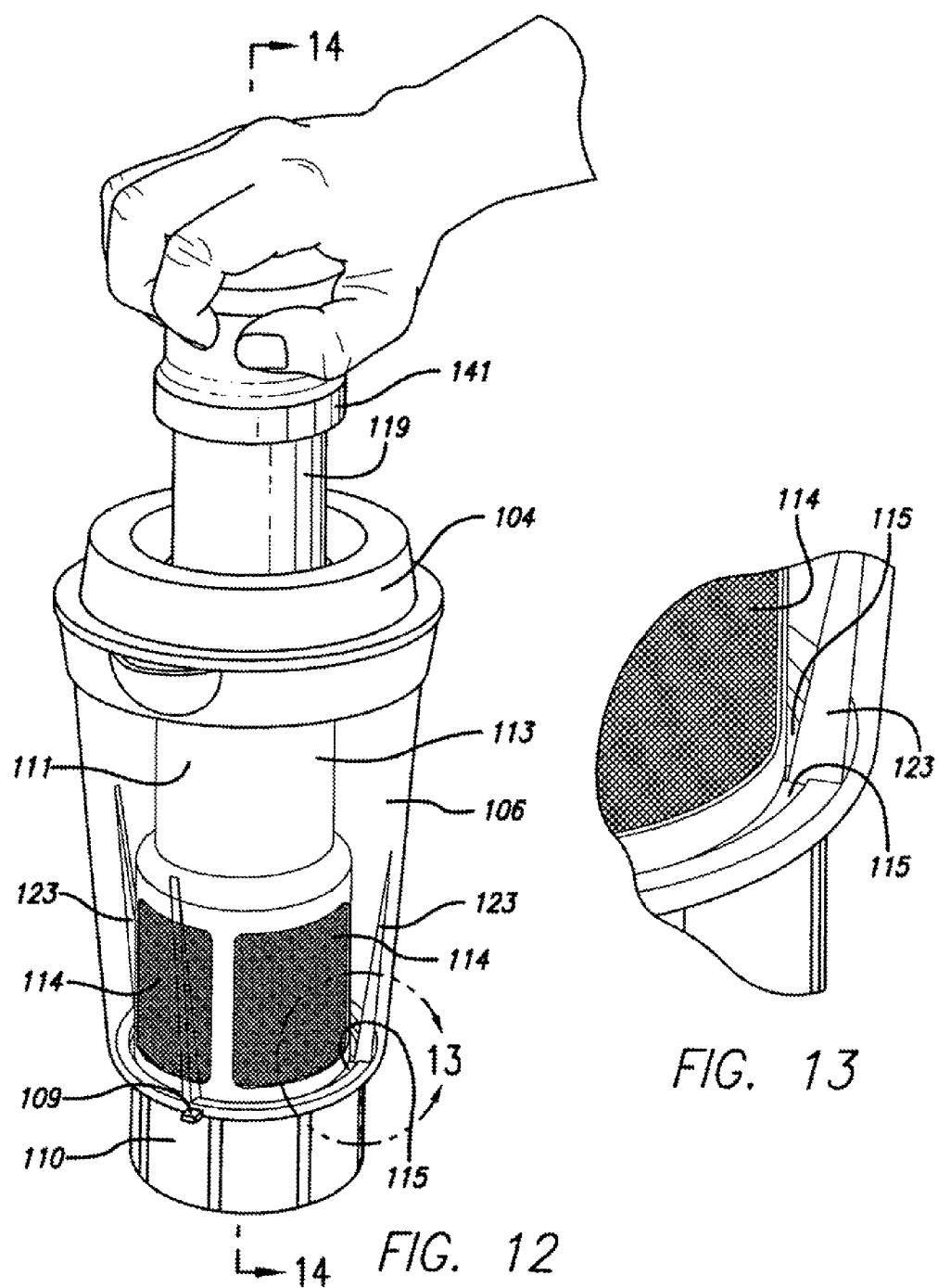

FOOD-PROCESSING DEVICE

PRIORITY CLAIM

This is a continuation of and claims the benefit of priority from my U.S. patent application Ser. No. 12/150,012, filed on Apr. 24, 2008 now U.S. Pat. No. 7,958,819, which is a continuation of and claims the benefit of priority from U.S. patent application Ser. No. 10/988,281, filed on Nov. 13, 2004, now U.S. Pat. No. 7,430,957, which is a continuation-in-part of and claims the benefit of priority from U.S. patent application Ser. No. 10/649,757, filed on Aug. 26, 2003, now U.S. Pat. No. 6,817,750, the full disclosures of which are incorporated herein by reference.

TECHNICAL FIELD

The present invention technically relates to household appliances. More particularly, the present invention technically relates to kitchen appliances. Even more particularly, the present invention technically relates to blenders and juicers.

BACKGROUND ART

Various devices for blending various liquids and solids have been developed over the years. These devices have various features and options to suit a wide variety of uses and applications. For example, many blenders exist that are either handheld or freestanding. While these devices have been useful, they can be difficult to clean, to use, and to store unused products, especially when preparing smaller batches. More specifically, freestanding devices can be too large and cumbersome to use for making smaller portions and are generally better designed for blending larger quantities of fluids and ingredients. Handheld units may be useful to make individualized portions, but they may lack the power to properly blend ingredients together. Furthermore, these handheld units are generally used with open containers such as bowls or cups that can increase the chances of spilling or splattering during preparation of the ingredients. Moreover, the unused portion would have to be poured out of the open container and into a sealable container to be stored or to be readily carried by a person. Accordingly, a long-felt need remains for a blender and juicer system that is easier to use, to clean, and to store unused products.

DISCLOSURE OF THE INVENTION

Exemplary embodiments disclosed herein are generally directed to a blender and juicer system. In accordance with one aspect of the invention, the blender and juicer system comprises a blender container, having an open top and an open bottom, and a removable juicer member being open at each end and being adapted for insertion into the blender container. The blender container is adapted to prevent the over-insertion of the juicer member. The inserted juicer member is adapted to operatively engage the interior of the blender container. The blender and juicer system also comprises a plunger being adapted for insertion into the juicer member. The inserted plunger is utilized during a juice extraction operation. The blender and juicer system further comprises a structure for defining the optimal range of plunger insertion into the removable juicer member. These and other aspects of the invention will become apparent from a review of the accompanying drawings and the section entitled "Mode(s) for Carrying-Out the Invention," infra.

BRIEF DESCRIPTION OF THE DRAWING(S)

For a better understanding of the present invention, reference is made to the below-referenced description of the accompanying Drawing. Reference numbers refer to the same or equivalent parts of the present invention throughout the several figures of the Drawing.

FIG. 2A is a perspective view of a container for use as part of the blender and juicer system of FIG. 1, in accordance with the present invention.

FIG. 2B is an inverted perspective view of the container of FIG. 2A, in accordance with the present invention.

FIG. 2C is an exploded perspective view of the container of FIG. 2A, in accordance with the present invention.

FIG. 2D is a perspective view of another container for use as part of the blender and juicer system of FIG. 1, in accordance with the present invention.

FIG. 7 is a perspective view of a blender container equipped with a removable juicer member for use as part of the blender and juicer system of FIG. 1, in accordance with the present invention.

FIG. 8 is a top perspective view of the blender container of FIG. 7, in accordance with the present invention.

FIG. 9 is a top perspective view of a removable base for the blender container of FIG. 7, in accordance with the present invention.

FIG. 12 is a perspective view of yet another exemplary embodiment of the present invention.

FIG. 13 is an enlarged detailed view taken along directional arc 13 of FIG. 12, in accordance with the present invention.

MODE(S) FOR CARRYING-OUT THE INVENTION

The detailed description set forth below in connection with the appended drawings is intended as a description of exemplary embodiments, i.e., the modes of carrying-out the invention, and is not intended to represent the only forms in which the exemplary embodiments may be constructed and/or utilized. The description sets forth the functions and the sequence of steps for constructing and operating the exemplary embodiments in connection with the illustrated embodiments. However, understood is that the same or equivalent functions and sequences may be accomplished by different embodiments that are also intended to be encompassed within the spirit and scope of the invention.

Some embodiments of the invention will be described in detail with reference to the related drawings of FIGS. 1-17. Additional embodiments, features and/or advantages of the invention will become apparent from the ensuing description or may be learned by practicing the invention. In the figures, the drawings are not to scale; however, like numerals refer to like features throughout both the drawings and the description.

Figure 1:
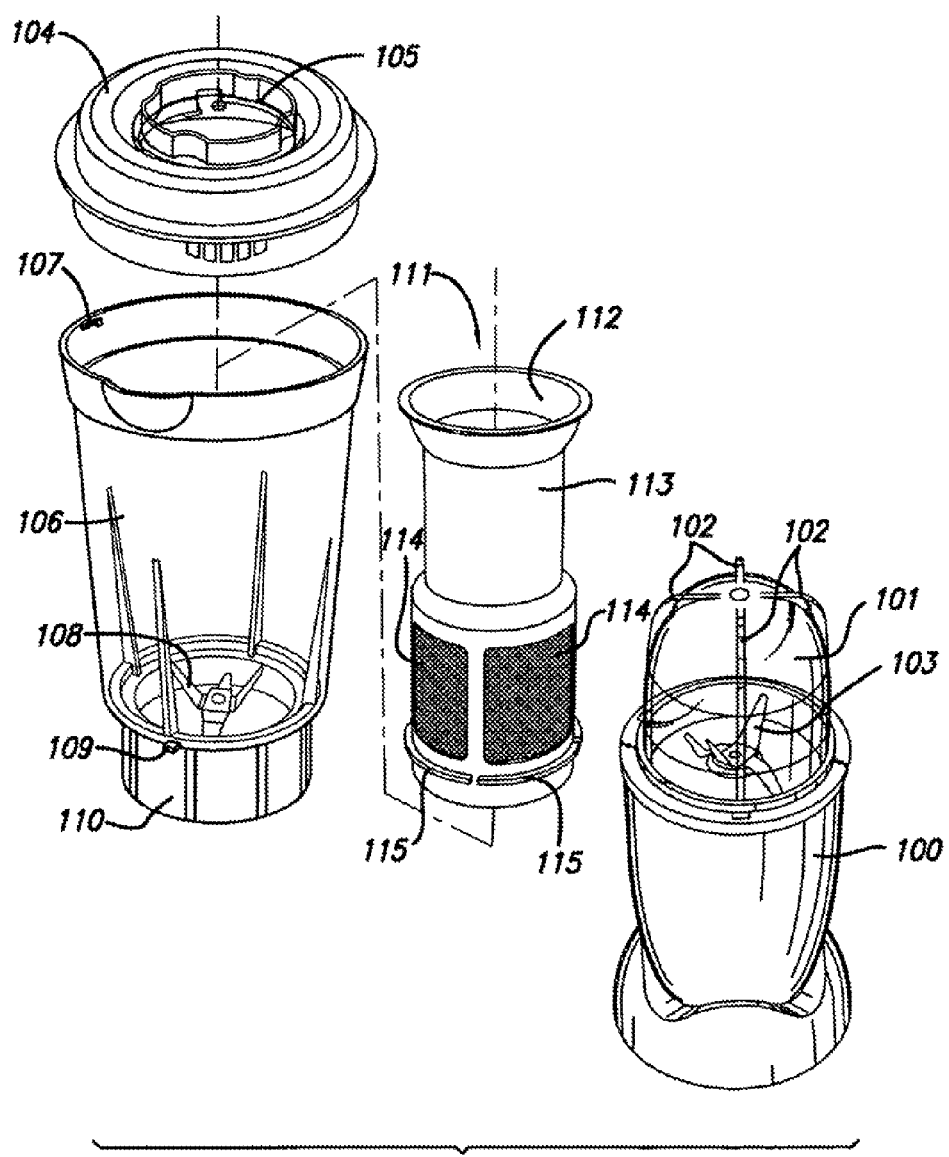
FIG. 1 is a perspective view of a blender and juicer system, in accordance with an exemplary embodiment of the present invention.

Turning to the drawings, FIG. 1 generally depicts a blender and juicer system comprising a generally bullet-shaped container 101 operatively coupled to a blender base 100, a juicer member 111 being open at each end, and a blender container 106 adapted to receive juicer member 111. The bullet-shaped container 101 includes a plurality of generally arcuate ridges 102 provided symmetrically on its outer surface, as generally illustrated in reference to FIGS. 1-2D. For purposes of this application, the term "blender" is generally defined as a device having whirling blades for chopping, mixing, or liquefying foods.

The blender container 106 has an open top and an open bottom. The blender container 106 includes selectively removable lid members 104, 105 (FIG. 1). The lid member 104 may be partially open to provide access to the interior of blender container 106. The lid member 105 may be coupled to the lid member 104 to cut off access to the interior of the blender container 106. The lid member 104 may be locked on to the open top of the blender container 106 via a cap-locking member 107. The cap-locking member 107 may be implemented, for example, as a generally L-shaped ridge disposed at the lip of blender container 106 (FIG. 1). The cap-locking member 107 engages a corresponding locking member (not shown) on the lid member 104 to securely lock the same to the blender container 106. Other suitable lid configurations may be utilized, as needed, such as a one-piece, a multi-piece lid cap, and/or the like.

The open bottom of blender container 106 may be coupled to a removable base portion 110 (FIG. 1) incorporating a blade member 108 (FIG. 1) adapted to agitate the contents of the container 106. The blade member 108 is operatively coupled to an impeller powered by a blender motor of the type generally shown in FIG. 5. The blade member 108 may include one, two, three, four or more cutting elements, as needed. The cutting elements may be generally flat members with sharpened edges, pointed tips, and one or more bends along the surface of the cutting elements.

The removable base portion 110 may be affixed to the bottom of blender container 106 via a thread-fit, a friction fit, a snap-fit, or any other suitable type of attachment. The open bottom of the blender container 106 is provided with a plurality of lateral (exterior) locking members 109, as generally shown in FIGS. 1, 7, and 11-12. The locking members 109 are adapted to operatively lock the blender container 106 to a blender base of the type generally shown in FIGS. 3-6.

FIGS. 2A-2D generally illustrate various configurations of the bullet-shaped container 101 which may be adapted for small or large servings to be prepared/consumed by one and/ or a few individuals. FIG. 2A generally shows the bullet-shaped container 101 resting on the external ridges 102 allowing users convenient access to its interior. For example, the bullet-shaped container 101 may be used as a drinking vessel. The external ridges 102 are generally shaped as being generally arcuate to permit the bullet-shaped container 101 to rest on its apex without tipping. The number of external ridges may be varied, as needed, as long as the bullet-shaped container 101 can stand upright on a substantially flat surface.

In another example, the user may blend the contents of the bullet-shaped container 101, detach the bullet-shaped container 101 from the blender base 100, access the contents of the bullet-shaped container 101 with the bullet-shaped container 101 standing upright (FIG. 2A) on a flat surface, and store the contents for later use using a cap 200 (FIGS. 2A-2C). The cap 200 may be affixed to the opening of the bullet-shaped container 101 via threads 204 (FIG. 2C). The cap 200 may also be affixed to the bullet-shaped container 101 via friction fit, snap-fit or other suitable type of attachment. Once the cap 200 is affixed, the bullet-shaped container 101 may be inverted to rest on the cap 200, as generally depicted in FIG. 2B.

In an alternate configuration, the bullet-shaped container 101 may be adapted to hold a relatively larger volume. The bullet-shaped container 101 may include a removable base 202, having a blade member 203, as generally shown in FIG. 2D. Moreover, as generally shown in FIGS. 2A-2D, the bullet-shaped container 101 may be provided with locking members 201 that are spaced about the periphery of the bullet-shaped container 101. The locking members 201 allow the user 127 to operate the blender without requiring a constant application of force to the bullet-shaped container 101 (in order to keep the motor switched in the "on" position).

Figures 3, 4:
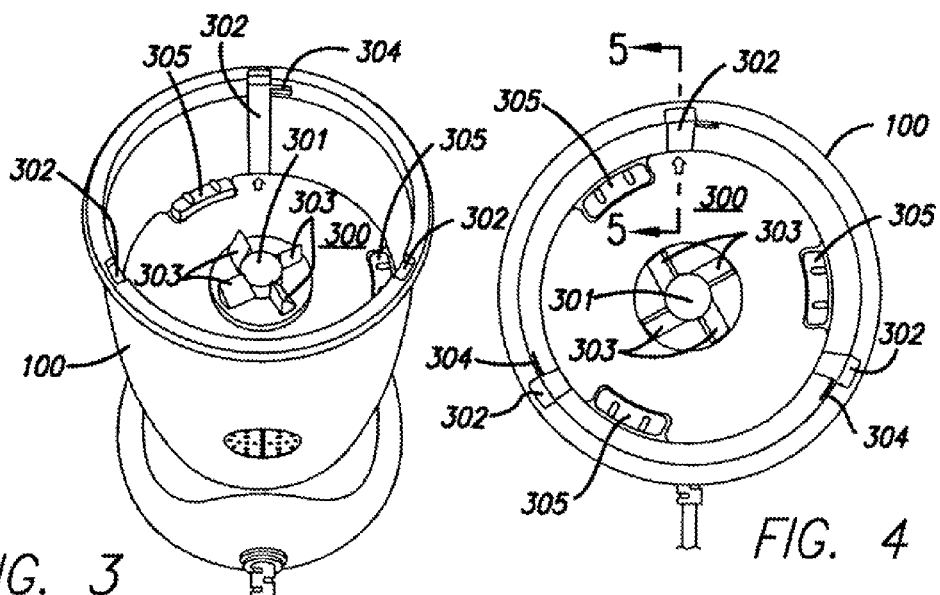
FIG. 3 is a perspective view of a blender base for use as part of the blender and juicer system of FIG. 1, in accordance with the present invention.
FIG. 4 is a top plan view of FIG. 3, in accordance with the present invention.

The blender base 100 includes a recessed well 300, as generally depicted in reference to FIGS. 3-4. The blender base 100 also includes a motor 500 (FIG. 5) that is operatively coupled to an impeller 301 (FIG. 3). The impeller 301 comprises a plurality of symmetrically disposed blades 303 radiating from the center of impeller 301. A plurality of bushings 305 (FIGS. 3-4) may be utilized about the periphery of recessed well 300. Alternatively, the blender base 100 may be adapted for use without utilization of the bushings 305. The bushings 305 may comprise a generally resilient material, such as, but not limited to, rubber, silicone, or the like, to reduce vibrations during agitation of the container contents.

The recessed well 300 comprises a plurality of pressure-activated switches 302 (FIGS. 3-4). The removable base 110 is adapted to fit within the recessed well 300 and to operatively couple with the impeller 301. While in use, the weight of the bullet-shaped container 101 or the blender container 106 causes the downward movement of the switches 302, thereby activating the motor 500. As generally shown in FIG. 3, a locking groove 304 may be provided adjacent to the switch 302. Accordingly, in use, i.e., when the locking members 201 (FIGS. 2A-2C) contact and depress the respective switches 302, the bullet-shaped container 101 or the blender container 106 may be rotated by the user 127 to allow the locking members 201 to engage the respective locking grooves 304.

Figures 5, 6:
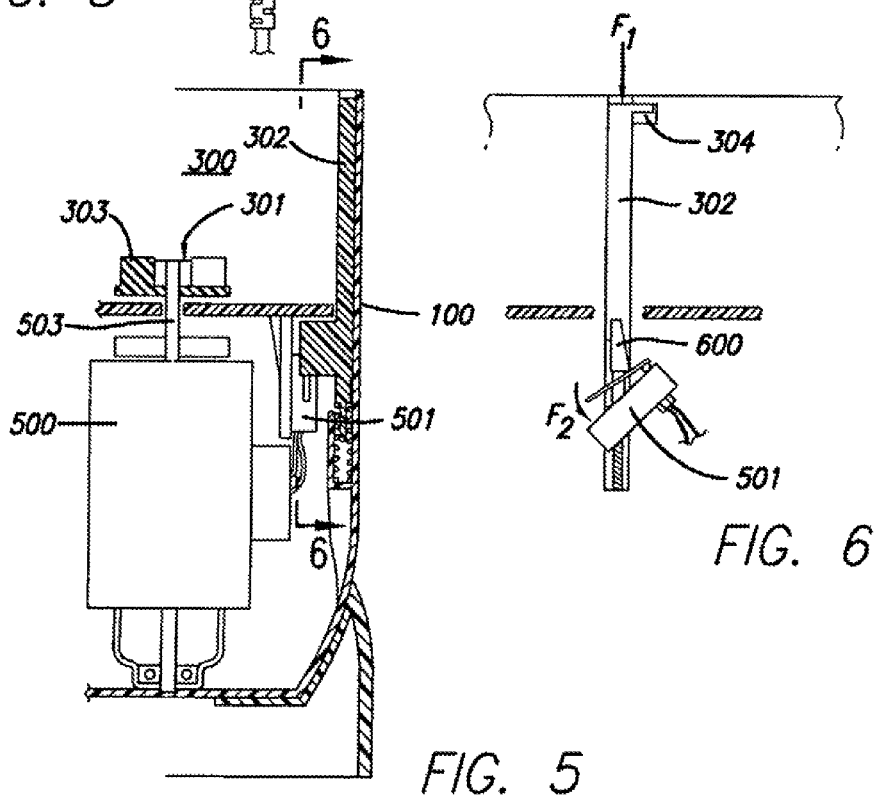
FIG. 5 is a cross-sectional view taken along section line 5-5 of FIG. 4, in accordance with the present invention.
FIG. 6 is a cross-sectional view taken along section line 6-6 of FIG. 5, in accordance with the present invention.

As generally depicted in FIG. 6, when a force $F_1$ is applied to the switch 302, the switch 302 moves downward, i.e., in the direction of the applied force $F_1$. This downward movement causes a cam 600 on the switch 302 to contact a motor power switch 501, thereby powering the blender motor 500 (FIG. 5). Accordingly, depending on the intended use or application, the bullet-shaped container 101 or the blender container 106 may be depressed in order to activate the motor 500 (FIG. 5) for relatively short periods of time. Alternatively, the bullet-shaped container 101 or the blender container 106 may be depressed and rotated slightly to allow the locking members 201 to engage the respective locking grooves 304, thereby permitting continuous operation of motor 500, i.e., without requiring the user, e.g., the user 127, to exert constant pressure on the bullet-shaped container 101 or the blender container 106 to keep the motor 500 running.

Figure 14:
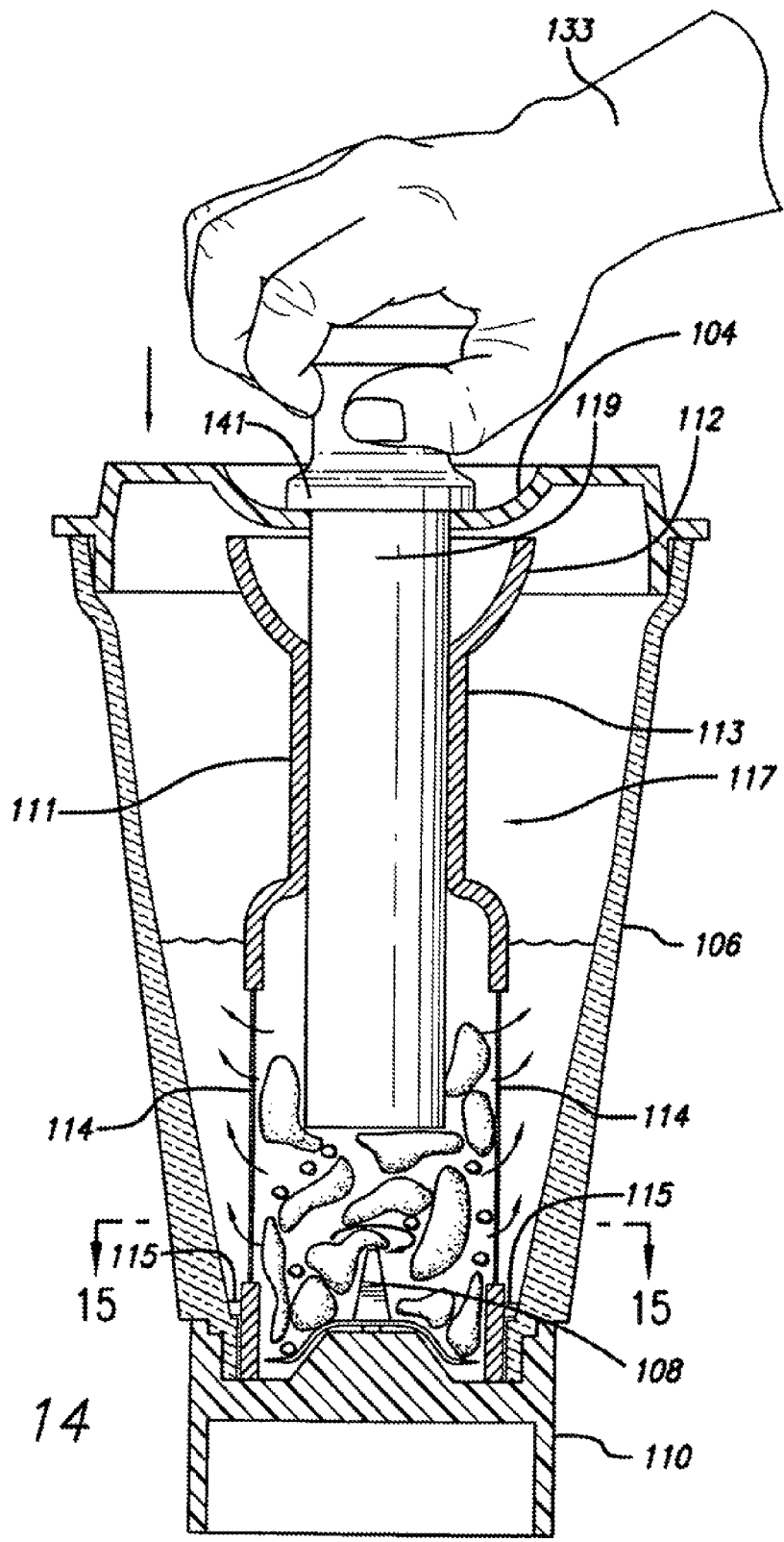
FIG. 14 is a cross-sectional view taken along section line 14-14 of FIG. 12, in accordance with the present invention.
Figure 15:
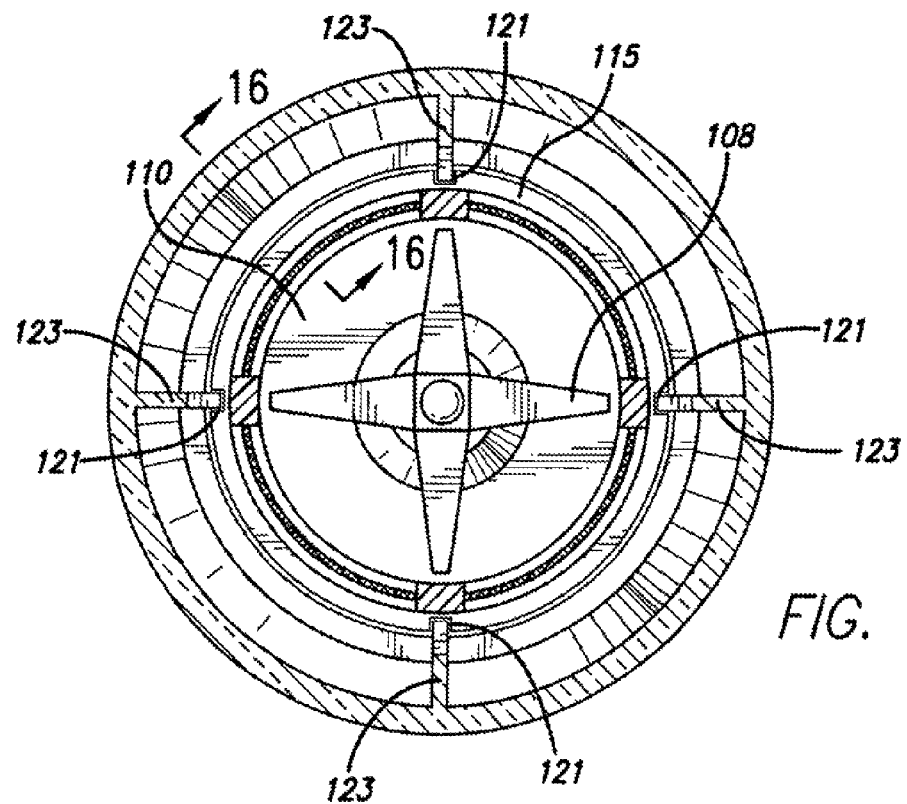
FIG. 15 is a cross-sectional view taken along section line 15-15 of FIG. 14, in accordance with the present invention.

The blender container 106 may be equipped with a removable juicer 117 (FIG. 14) comprising hollow juicer member 111 and a generally elongated plunger 119 adapted for insertion into juicer member 111 via a removable (and partially open) lid member 104, as generally illustrated in FIGS. 12 and 14. The juicer member 111 has a generally circular cross-section which varies somewhat in diameter from top to bottom, as generally shown in FIGS. 1, 7, 10-12, and 14. The plunger 119 (FIGS. 12 and 14) may be configured as a solid body. Alternatively, the plunger 119 comprises a partially hollow configuration, such as being closed at the bottom and open at the top. This type of plunger configuration may be appropriate for measuring foodstuffs and the like. Other suitable plunger configurations may be utilized, if necessary.

Figure 11:
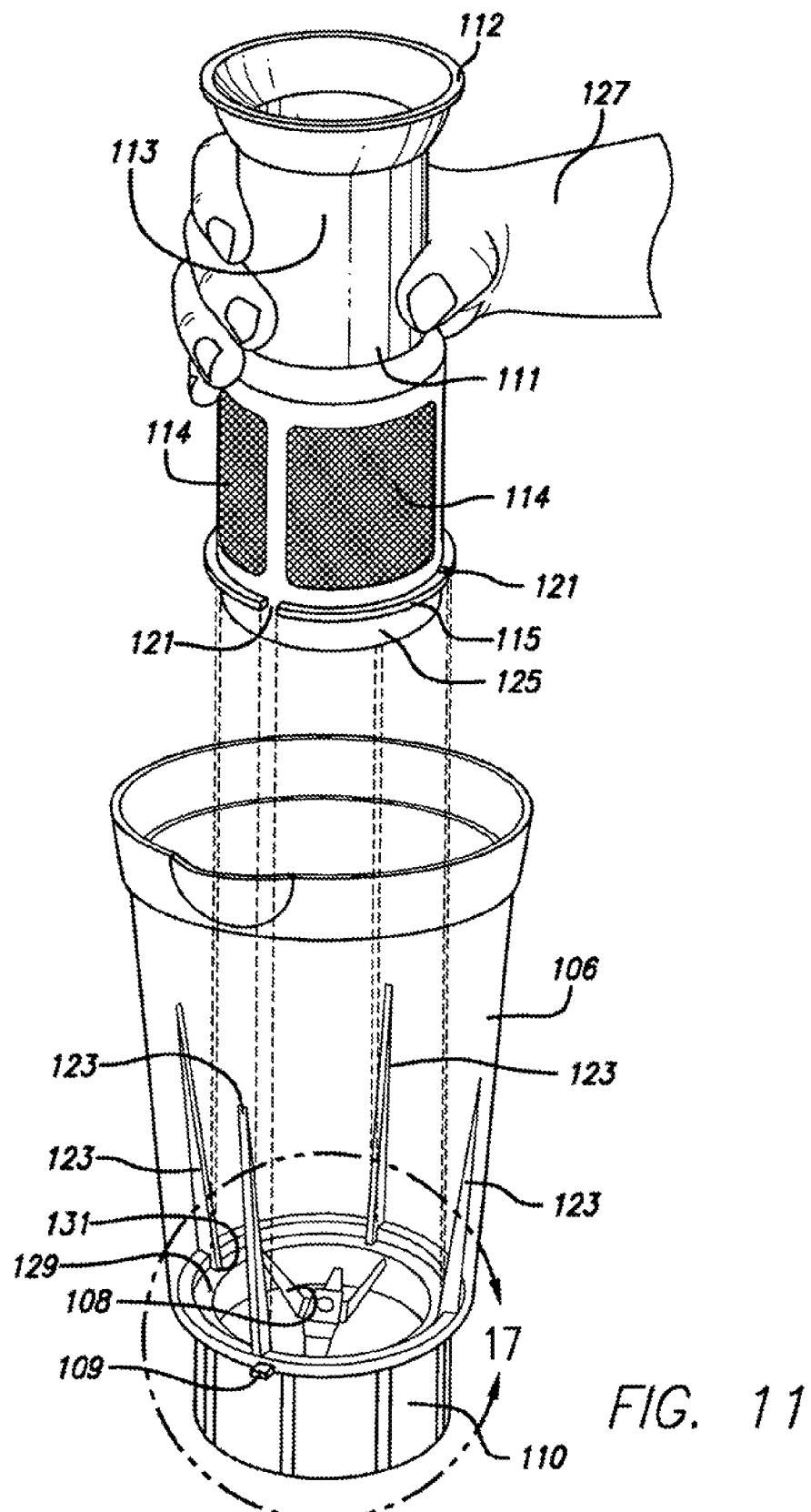
FIG. 11 is a perspective view of another exemplary embodiment of the present invention.

The juicer member 111 includes a generally tubular body 113 of variable diameter being equipped at one end with a multi-panel sieve filter 114 and a funnel 112 at an opposite end, as generally depicted in FIG. 11. The tubular body 113 includes a base portion 125 (FIG. 11) disposed downstream from filter 114. The base portion 125 comprises a generally annular outer lip 115 (FIG. 11) which includes a plurality of indentations 121 adapted to removably engage a corresponding set of generally elongated ridges 123 being integrally formed on the interior of the blender container 106, as generally illustrated in FIG. 11.

Figure 16:
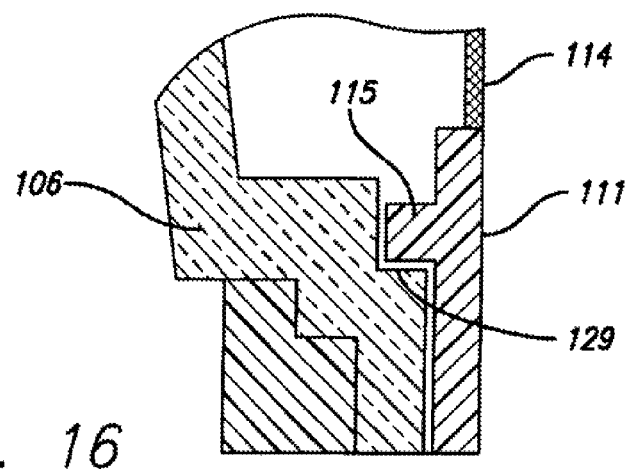
FIG. 16 is a cross-sectional view taken along section line 16-16 of FIG. 15, in accordance with the present invention.
Figure 17:
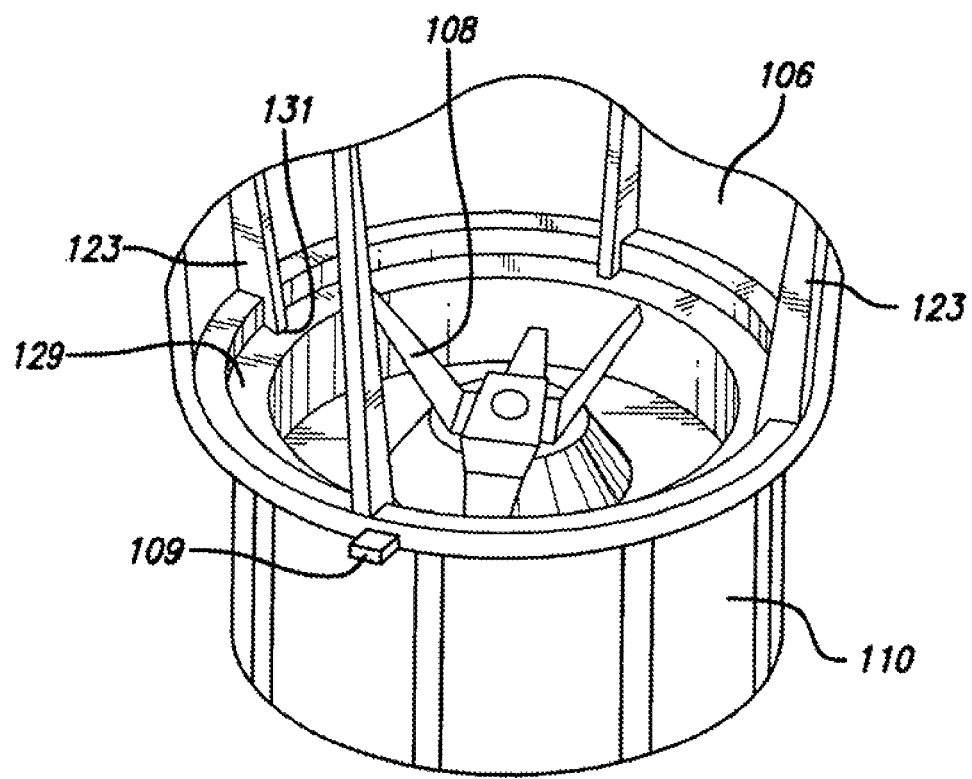
FIG. 17 is an enlarged detailed view taken along directional arc 17 of FIG. 11, in accordance with the present invention.

Each one of the ridges 123 has a generally triangular cross-section that flares toward the removable base portion 110 (FIG. 11). Each indentation 121 is configured to somewhat loosely engage a respective ridge 123 as the juicer member 111 is inserted into the blender container 106 by a user 127 (FIG. 11). To prevent over-insertion of the juicer member 111, the blender container 106 comprises an inwardly protruding internal step 129 (FIGS. 11, 16-17) being adapted to stop the advance of the outer lip 115 (FIG. 16). The internal step 129 extends under and away from the base portions 131 of the ridges 123 into the interior of the blender container 106, thereby allowing the outer lip 115 to securely rest on top of it, as generally depicted in FIGS. 11 and 16-17.

The user 127 inserts juicer member 111 with the indentations 121 being generally lined up with the respective ridges 123 to ensure proper operation of juicer 117, as generally illustrated in FIG. 11-14. The blade member 108 is operatively disposed within the base portion 125 and the filter 114 (of juicer member 111) when the juicer member 111 is supported by the internal step 129 and the removable base portion 110 is affixed to the blender container 106. The indentations 121 may be adapted to afford a certain degree of lateral movement of the outer lip 115 of the juicer member 111 within the blender container 106, i.e., generally toward/away from the respective ridges 123, when the juicer member 111 is supported by the internal step 129.

A multi-panel sieve filter 114 may comprise a wire mesh screen material or the like. The filter 114 generally conforms to the shape of the tubular body 113, as generally shown in FIGS. 1, 7, and 11-12. The filter 114 is adapted to strain juice being generated (within hollow juicer member 11) by a user 133 pushing fruit and/or vegetable fragments generally downward (toward the base portion 110) via the plunger 119 when the blade member 108 is operative, as generally illustrated in FIG. 14.

Figure 10:
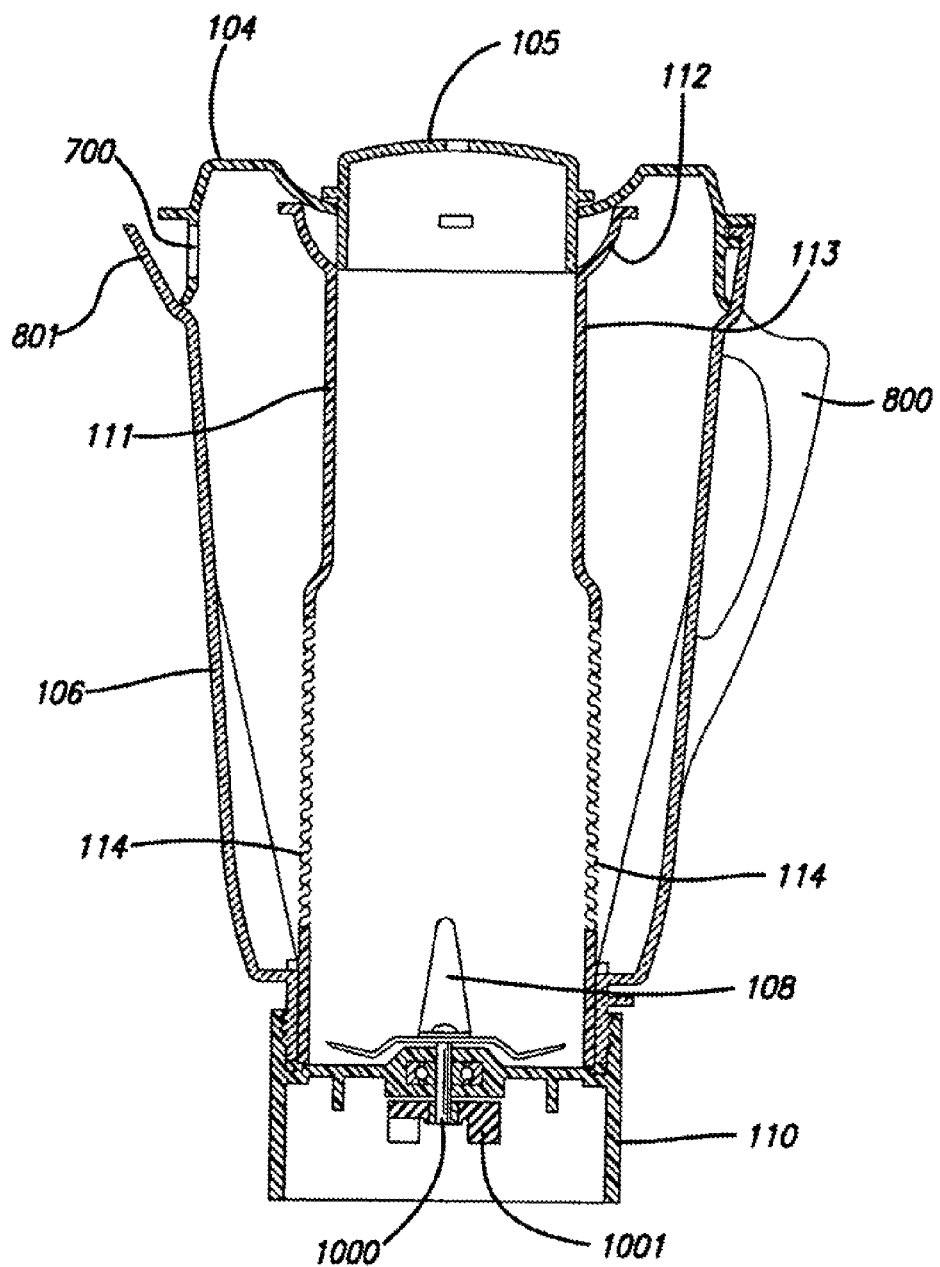
FIG. 10 is a cross-sectional view taken along section line 10-10 of FIG. 7, in accordance with the present invention.

The opening provided by the removable lid member 104 is adapted to accommodate the plunger 119, as generally shown in FIG. 12. The plunger 119 includes a top exterior lip 141 (FIGS. 12 and 14) which is adapted to contact the interior of the funnel 112 (FIG. 14) and to prevent the plunger 119 from advancing further into the tubular body 113 during the juice 15 extraction operation. The top exterior lip 141 defines the optimal range of plunger insertion into the tubular body 113. The plunger 119 and the rotating blade member 108 force the generated juice to flow from the interior of the tubular body 113 into the interior of the blender container 106 (FIG. 14), where it is collected for consumption by the user 133. The blender motor 500 transmits a rotational force to the blade member 108 via a motor shaft 1000 and a mating impeller 1001, as generally depicted in FIG. 10.

The remaining pulp is separated and trapped within the interior of the juicer member 111. By providing a two-part cap, such as implemented by the lid members 104, 105 of FIG. 1, users, e.g., users 133, can access the contents of the juicer member 111 without removing the entire cap or interrupting the operation of the blender for fear of spillage or splattering. For example, the user, e.g., the user 133, may remove the lid member 105 to add more food fragments to the juicer member 111 for juice extraction.

The lid member 104 may be provided with a plurality of slots 700 (FIG. 7) to decant the contents of the blender container 106 while the lid member 104 remains affixed to the top of the blender container 106. The blender container 106 may include a handle 800 and a spout 801 that facilitates decanting of the contents of the blender container 106, as generally depicted in FIG. 8. The lid member 104 is affixed to the top of the blender container 106 with slots 700 being disposed generally behind the spout 801 to allow decanting of extracted juice, as generally shown in FIG. 7. Once all the extracted juice has been decanted from the fruit and/or vegetable fragments, the user 133 may remove the plunger 119, the lid member 104, the juicer member 111, and the base portion 110 from the blender container 106 for cleaning.

Information, as herein shown and described in detail, is fully capable of attaining the above-described object of the invention. The presently preferred embodiment of the invention, is, thus, representative of the subject matter which is broadly contemplated by the present invention. The scope of the present invention also fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem that is sought to be resolved by the present invention, for such to be encompassed by the present claims. Furthermore, no element, component, or method step in the present disclosure is intended to be dedicated to the public, regardless of whether the element, component, or method step is explicitly recited in the claims. However, that various changes and modifications, in form, material, and fabrication material detail, may be made, without departing from the spirit and scope of the invention as set forth in the appended claims, should be readily apparent to those of ordinary skill in the art as being encompassed by the present invention. No claim herein is to be construed under the provisions of 35 U.S.C. §112, sixth paragraph, unless the element is expressly recited using the phrase "means for."

Industrial Applicability

The present invention industrially applies to household appliances. More particularly, the present invention industrially applies to kitchen appliances. Even more particularly, the present invention industrially applies to blenders and juicers.

What is claimed is:

1. A food-processing device for chopping, mixing, or liquefying foods, the device comprising:
    a container comprising a plurality of locking members that are located at and are spaced about the periphery of the container, the container having an opening;
    a removable base comprising a blade member, the removable base removably affixable to the opening of the container; and
    a blender base comprising a motor and a recessed well, the recessed well comprising a plurality of pressure-activated switches and locking grooves, each locking groove located adjacent to its respective pressure-activated switch, the removable base adapted to removably fit within the recessed well such that when the locking members of the container contact and depress the respective switches, the downward movement of the switches activate the motor, wherein the container can be depressed and rotated to allow the locking members to engage the respective locking grooves, thereby permitting continuous operation of the motor without requiring a user to exert constant pressure on the container.

2. A food-processing device for chopping, mixing, or liquefying foods, the device comprising:
    a container comprising a locking member, the locking member located at the periphery of the container, the container having an opening;
    a removable base comprising a blade member, the removable base removably affixable to the opening of the container; and
    a blender base comprising a motor, a recessed well and a plurality of bushings, the bushings located about the periphery of the recessed well, the recessed well comprising a pressure-activated switch and a locking groove, the locking groove located adjacent to the switch, the removable base adapted to removably fit within the recessed well such that when the locking member of the container contacts and depresses the switch, the downward movement of the switch activates the motor, wherein the container can be depressed and rotated to allow the locking member to engage the locking groove, thereby permitting continuous operation of the motor without requiring a user to exert constant pressure on the container.

3. The food-processing device of claim 2, wherein the plurality of bushings comprise a substantially resilient material.

* * * * *